United States Patent

Dillard

[15] 3,690,080
[45] Sept. 12, 1972

[54] SOLAR ARRAY WITH SELF-ERECTING, SELF-RIGIDIZING ROLL-UP SHEETS

[72] Inventor: Paul A. Dillard, Littleton, Colo.

[73] Assignee: TRW Inc., Redondo Beach, Calif.

[22] Filed: Sept. 21, 1970

[21] Appl. No.: 73,758

[52] U.S. Cl. ..................52/108, 52/111, 160/84, 242/54 A, 343/915, 343/DIG. 2
[51] Int. Cl. ...........................................E01q 15/20
[58] Field of Search.......52/108, 173, 111; 242/54 R, 242/54 A; 343/915, DIG. 2; 160/84

[56] References Cited

UNITED STATES PATENTS

| | | | |
|---|---|---|---|
| 1,758,600 | 5/1930 | Grassi | 160/84 R |
| 2,667,218 | 1/1954 | Collins | 160/84 R |
| 3,369,589 | 1/1968 | Benkert, Jr. | 160/84 R |
| 3,434,255 | 3/1969 | Rabenhorst | 52/108 |
| 3,465,567 | 9/1969 | Park | 343/DIG. 2 |
| 3,467,328 | 9/1969 | Berry et al. | 242/54 R |
| 3,474,976 | 10/1969 | Rushing et al. | 52/108 |

*Primary Examiner*—Henry C. Sutherland
*Assistant Examiner*—Leslie A. Braun
*Attorney*—Daniel T. Anderson, Donald R. Nyhagen and Jerry A. Dinardo

[57] ABSTRACT

A deployable panel for a spacecraft deployable solar array and other deployable structures. The panel has a number of panel sections hinged edge-to-edge for folding to a stowage configuration wherein the sections are disposed in confronting face-to-face relation and extension to a flat unfolded configuration wherein the panel sections are disposed in coplanar relation. Fixed to selected edges of the panels are sheets which are held flat between the panel sections in the folded configuration of the panel and curl into tubular beams for deploying the panel to unfolded configuration and/or rigidizing the panel when the latter is extended to unfolded configuration. In a solar array the sheets provide protection covers for the solar cells when the solar panel is folded. A deployable panel structure embodying the panel.

20 Claims, 6 Drawing Figures

PATENTED SEP 12 1972 3,690,080

Paul A. Dillard
INVENTOR.

BY
ATTORNEY

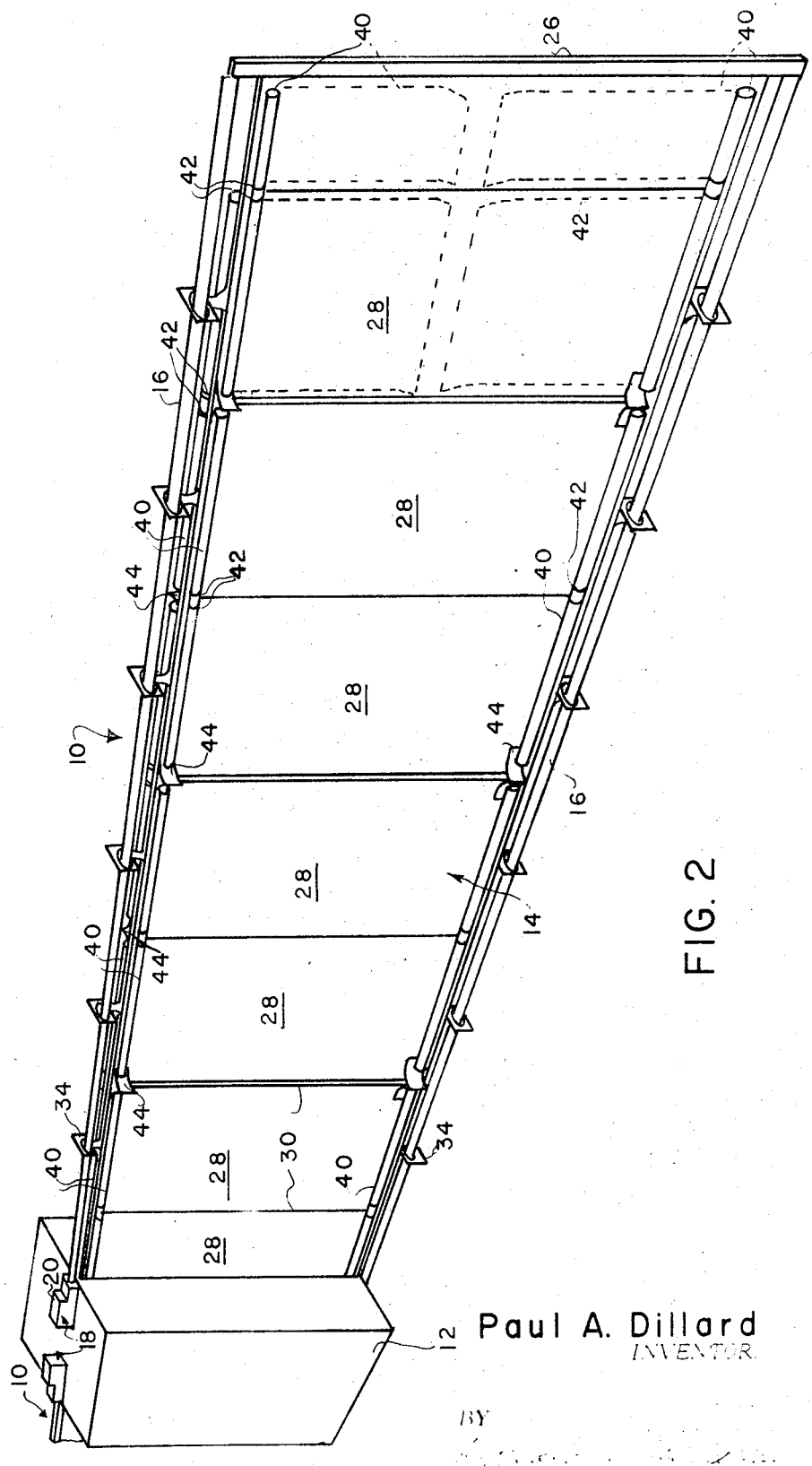

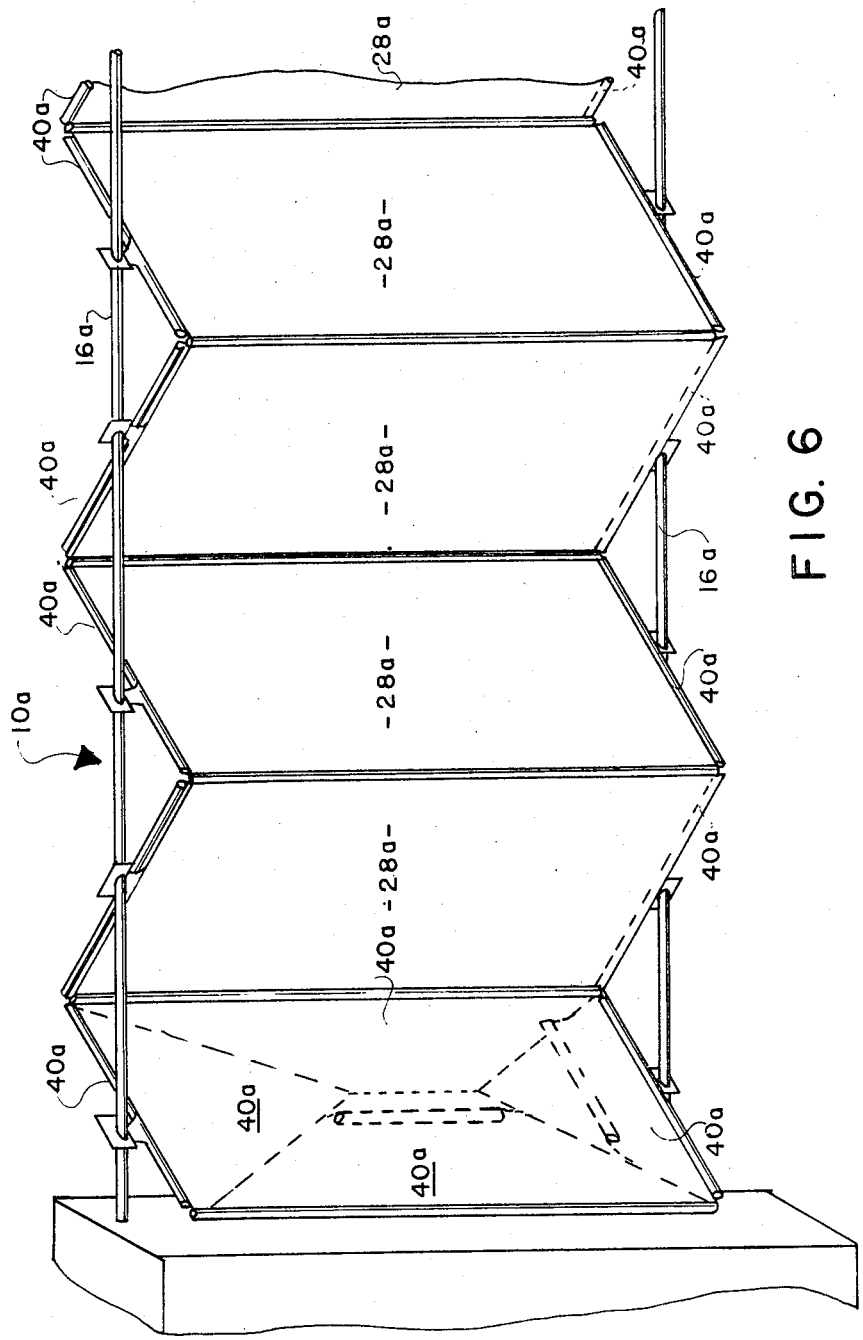

SOLAR ARRAY WITH SELF-ERECTING, SELF-RIGIDIZING ROLL-UP SHEETS

BACKGROUND OF THE INVENTION

1. Field of the Invention

This invention relates generally to deployable structures for spacecraft and the like and more particularly to a deployable folding panel and a deployable panel structure embodying the panel.

2. Prior Art

As will appear from the ensuing description, the deployable panel and panel structure of the invention may be utilized for various purposes such as antennas, solar arrays, and others. The invention will be disclosed in connection with a solar array.

Deployable solar arrays of the class to which this invention pertains have a deployment boom mechanism mounted on a supporting structure, such as a spacecraft, and a folding solar panel attached to the boom mechanism for extension with the latter from a compact stowed configuration to a flat deployed configuration. The solar panel has a number of panel sections joined edge-to-edge along interconnecting hinge lines. In stowed configuration, the deployment boom is retracted to the supporting structure, and the solar panel is folded accordion-fashion with the panel sections disposed in confronting face-to-face relation flat against the structure. During deployment, the boom is extended outwardly from the supporting structure to a deployed position wherein the solar panel sections are disposed substantially in a common plane.

SUMMARY OF THE INVENTION

The present invention provides a deployable folding panel and deployable panel structure embodying the panel which may be employed in a deployable solar array as well as in other deployable structures, such as antennas. The folding panel of the invention has a number of panel sections hinged edge-to-edge along hinge lines normal to the longitudinal panel edges. The panel is foldable accordion-fashion on the hinge lines to a folded stowage configuration wherein the panel sections are disposed in confronting face-to-face relation. The panel is extendable to an unfolded configuration wherein the panel section are disposed edge-to-edge in generally flat coplanar relation.

In the present deployable panel structure, the folding panel is attached at one end to a support, such as the body of a spacecraft, for extension of the panel from a stowed configuration wherein the panel is folded flat against the spacecraft to an unfolded deployed configuration. One disclosed embodiment of the panel structure has a self-erecting or deployable and self-rigidizing panel. Another disclosed embodiment requires an extendable boom for deployment but is self-rigidizing.

A primary feature of novelty of the folding panel resides in resiliently flexible roll-up sheets which are secured to selected edges of the panel sections. These sheets are preformed to curl into tubular beams. When the panel is retracted to its folded configuration, the sheets are held flat between the facing panel sections. In a solar array, the sheets, when thus flattened between the facing panel sections, provide protective covers for the solar cells on the panel sections. When the panel is extended or deployed to its flat unfolded configuration, the elastic strain energy in the sheets curls the sheets into tubular beams which rigidize the panel.

In a self-erecting and rigidizing deployable panel structure according to the invention, the roll-up sheets bridge hinge lines of the folding panel in a manner such that the elastic strain energy stored in the sheets, when flattened between the folded panel sections, at least aids deployment of the panel. The flattened roll-up sheets may possess sufficient elastic strain energy in themselves, or when aided by additional panel unfolding springs, to deploy the panel without the assistance of a deployment boom. If a deployment boom is used, the latter serves merely to guide and control the rate of panel deployment. When the panel is fully deployed, the beams, formed by the roll-up sheets, bridge the hinge lines of the panel to rigidize the latter against folding on the hinge lines. Additional sheets may be attached to the panel sections along their hinged edges to rigidize the sections along these edges.

BRIEF DESCRIPTION OF THE DRAWINGS

In the drawings:

FIG. 2 illustrates a deployable solar array embodying the invention in deployed configuration;

FIG. 6 illustrates a modified solar array according to the invention.

DESCRIPTION OF THE PREFERRED EMBODIMENTS

Figure 1:
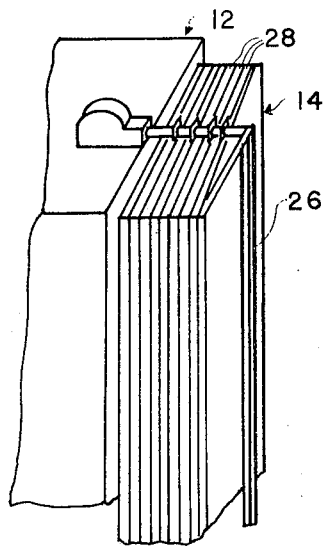
FIG. 1 illustrates the solar array in stowed configuration.

FIGS. 1 through 5 of the drawings illustrate a pair of solar arrays 10 according to the invention mounted on a support 12 which, in this instance, is a spacecraft. The two arrays are identical and are located at opposite sides of the spacecraft for outward extension from their stowed configurations of FIG. 1 to their deployed configurations of FIG. 2.

Each solar array 10 has a folding solar panel 14 and a pair of deployment booms 16 along the longitudinal panel edges. EAch deployment boom 16 is the extendable member of a so-called linear extender 18 which includes, in addition, an actuator 20. Linear extenders of this kind are well-known in the art and hence need not be described in detail. Suffice it to say that the extender boom 16 comprises a strip of spring metal which is wound in flat condition on a motor driven reel (not shown) within the actuator 20 and is stressed to curl laterally into a tubular configuration as it leaves the reel. The boom exits from the actuator through a guide which is sized to slidably receive the boom in its tubular configuration. The actuator motor is reversible to drive the actuator reel in either direction to extend the boom from or retract the boom into the actuator. In the particular inventive embodiment illustrated, the actuators 20 of the two solar arrays 10 are mounted on the body of the spacecraft 12 for extension of their booms 16 beyond opposite sides of the body.

Attached to the outer ends of each pair of deployment booms 16 is a cross-member 26 extending parallel to the longitudinal axis of the spacecraft 12. When the deployment booms are retracted, this cross-member is located close to the adjacent side of the spacecraft body.

Each solar panel 14 has a number of rectangular panel sections 28 joined edge-to-edge by intervening hinge means 30. The hinging axes of these hinge means parallel one another and extend normal to the longitudinal panel edges and to the deployment axes of the respective booms 16. Each panel section 28 comprises a thin-film substrate of Mylar, Kapton, or other suitable plastic mounting for solar cells 32. The inner and outer panel sections 28 of each solar panel 14 are attached to the spacecraft 12 and to the boom cross-member 26 by hinge means having hinging axes parallel to the hinging axes of hinge means 30. Formed integrally with the substrate of each panel section and projecting from the longitudinal edges of the substrate, along the center line of the panel section, are apertured tabs 34 which slide on the deployment booms 16.

During launch, the solar arrays 10 are retracted to their stowage configuration of FIG. 1. In this configuration, the deployment booms 16 are retracted into their actuators 20. The solar panels 14 are folded accordion-fashion with the panel sections 28 disposed in confronting face-to-face relation flat against the adjacent sides of the spacecraft 12 so as to permit containment of the spacecraft and solar arrays within the shroud of a launch vehicle. The solar cells 32 on the panel sections are then disposed in face-to-face relation. The folded panel sections 28 are then held firmly in place by the boom cross-members 26 which preload the panels to prevent damage to panels and solar cells by "flapping" during launch vibration.

After orbit is achieved, the shroud of the launch vehicle is separated from the spacecraft 12. The deployment booms 16 are then extended to their positions of FIG. 2. This deployment of the booms effects unfolding of the solar panels 14 to their deployed configuration of FIG. 2. In this deployed configuration, the panel sections 28 of each solar array are disposed substantially in a common plane containing the respective deployment booms 16.

According to the present invention, resiliently flexible roll-up sheets 40 of Mylar, Kapton, or other resiliently flexible sheet material are secured along one edge to selected edges of the solar panel sections 28. Sheets 40 serve a three-fold purpose. First, the sheets serve as protective covers for the solar cells 32 when the solar arrays 10 occupy their folded stowage configurations. Secondly, the sheets aid or actually cause unfolding of the solar panels 14 to their deployed configurations during extension of the deployment booms 16. Thirdly, the sheets rigidize the solar panels in their deployed configuration.

To these ends, each side of each solar panel 14 mounts a number of the roll-up sheets 40. The roll-up sheets are secured along one edge to the folding panel sections 28 along the longitudinal panel edges. The sheets are preformed to curl or roll up into tubular rigidizing beams. In the particular inventive embodiment of FIGS. 1 through 5, each roll-up sheet spans two adjacent panel sections 28 at the sides of the sections which face one another in the folded configuration of the solar panel. Accordingly, the roll-up sheets at each side of the solar panel are located at the inner sides of the panel folds. The sheets at the two sides of the solar panel are staggered in a manner such that the sheets at one panel side bridge alternate panel hinge lines and the sheets at the opposite panel side bridge the intervening hinge lines.

Figure 3:
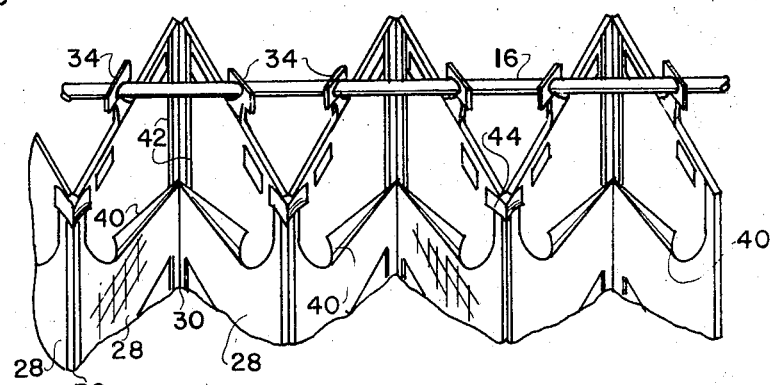
FIGS. 3 through 5 are enlarged fragmentary views illustrating the unfolding action of the array.
Figure 5:
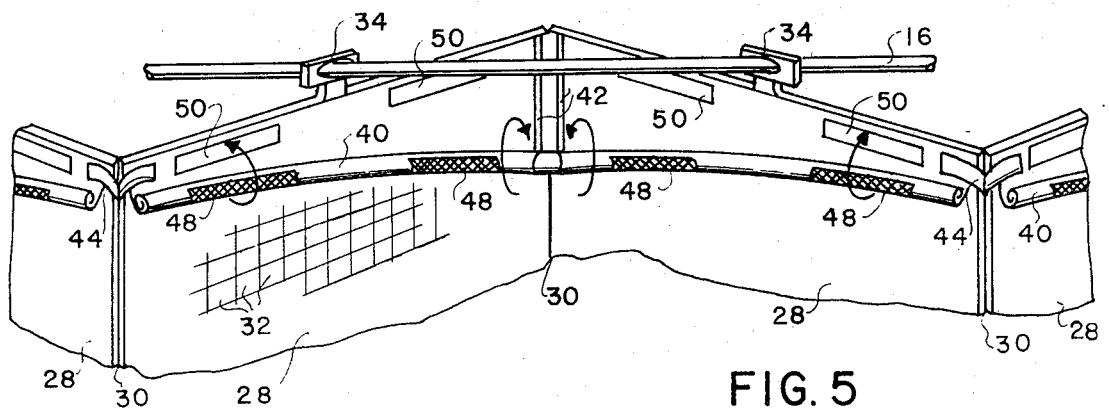
Figure 4:
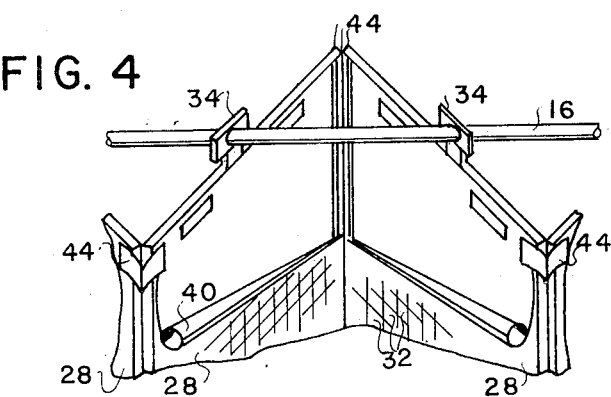

When the solar array 10 is retracted to its stowed configuration, the sheets 40 are unrolled and folded on the hinge lines of the solar panel 14 such that sheets are doubled and held flat between the folded panel sections 14. In this flat condition, the sheets contain or store elastic strain energy which tends to unfold and then curl or roll the sheets into their tubular beam configuration during deployment of the solar array, as illustrated in FIGS. 3 through 5. Upon arrival of the solar array at full deployment, the sheets assume their final tubular beam shapes to rigidize the solar panel 14 against folding on its hinge lines.

The present invention contemplates erection, i.e. unfolding, of the solar panel 14 to its deployed configuration either with or without the assistance of the deployment booms 16. That is to say, the solar panel may be designed such that the deployment booms furnish a portion of the force required to unfold the panel to its deployed configuration. Alternatively, the panel may be designed to have sufficient elastic strain energy in its folded configuration to unfold the panel to full deployment without any assistance from the deployment booms. In this latter case, the deployment booms serve merely to guide and control the rate of panel deployment and may be even eliminated if desired.

The self-erecting design of the solar panel 14 constitutes the preferred practice of the invention. As just noted, such self-erection of the panel requires the latter to possess sufficient elastic strain energy in its folded configuration to fully deploy the panel, when released, without any assistance from the deployment booms 14 except for guidance and deployment rate control. The elastic strain energy in the roll-up sheets 40 is supplemented by self-coiling roll-up springs 42 fixed to the sheets parallel to and at opposite sides of the lines along which the sheets are folded in the stowed configuration of the solar panel 14 and by spring clips 44 secured to the panel sections 28 along their hinge lines. The springs 42 are preformed to supplement the elastic unfolding and roll-up forces in the roll-up sheets 40 when the latter are in their folded and flattened configuration. In this regard, attention is directed to FIGS. 3 through 5 which illustrate the manner in which the springs aid in unfolding of the roll-up sheets while the solar panel 14 is only partially deployed, such that the roll-up action of the sheets is rendered effective in unfolding the solar panel to its fully deployed configuration. In this regard, it will be observed that the springs 42 break the kinks at the fold lines of the roll-up sheets to cause both sides of the sheets to roll-up together. The spring clips 44 bridge the solar panel hinge lines and are preformed to normally assume the shapes which they have (FIG. 2) when the panel is fully deployed. Accordingly, when the solar panel is folded to its stowed configuration, the clips contain elastic strain energy which aids the elastic panel unfolding forces of the roll-up sheets and their spring strips.

According to a preferred feature of the invention, means are provided for positively securing the roll-up sheets 40 in their fully deployed tubular beam configurations. The particular securing means shown comprise mating Velcro hook and pile pads 48, 50 secured to opposite surfaces of each roll-up sheet adjacent its fixed and free edges in positions such that the pads enter into interlocking engagement upon curling of the sheets into their final tubular beam configurations. In the event that a set of the pads 48, 50 do not fully engage immediately upon arrival of the roll-up sheets in their fully curled beam shapes, the initial transverse loading imposed on the solar panel will press the pads into firm interlocking engagement. After pads 48, 50 are engaged, maximum stiffness of the deployed panel is attained.

FIG. 6 illustrates a modified deployable panel structure or solar array 10a according to the invention having roll-up sheets 40a along all four edges of alternate panel sections 28a. When the solar array is retracted to its stowed configuration, the sheets are held flat between the folded confronting panel sections and serve as protective covers for the panel solar cells, as in the previous embodiment. During deployment of the solar array, the roll-up sheets curl into tubular beams which rigidize the panel sections along both their longitudinal and hinged edges. In contrast to the earlier form of the invention, the roll-up sheets 40a do not aid deployment of the solar panel 14a. Accordingly, the solar array deployment booms 16a are required for deployment.

It is significant to note that both the roll-up sheets 40 and 40a are so shaped that the sheets on each solar panel section do not overlap in their flattened configuration of stowage. This permits each sheet to curl to its beam shape independently of the other sheet or sheets on the respective panel section during deployment. As a consequence, the roll-up sheets on each panel section curl to their beam shapes concurrently during deployment.

What is claimed as new in support of letters patent is:

1. A deployable folding panel construction comprising:
    a rectangular folding panel having parallel hinge lines normal to the longitudinal sides of said panel and defining intervening rectangular panel sections having adjacent edges along said hinge lines and side edges along said panel sides, such that said panel is contractable to a folded configuration wherein said panel sections are disposed in confronting face-to-face relation, and said panel is extendable to an unfolded configuration wherein said panel sections are disposed in substantially coplanar relation;
    resiliently flexible sheets secured along one edge to said panel sections along selected edges of said sections; and
    said sheets being preformed to curl into a tubular configuration and being confined in a flat configuration between said panel sections when said panel occupies its folded configuration, whereby the confined flat sheets store elastic strain energy for curling said sheets to their tubular configuration to provide tubular rigidizing beams along said selected panel section edges when said panel is extended to its unfolded configuration.

2. A panel construction according to claim 1 wherein:
    said selected panel section edges are said side edges of said panel sections.

3. A panel construction according to claim 1 wherein:
    said sheets bridge hinge lines of said panel in a manner such that curling of said sheets under the action of said strain energy aids extension of said panel, and said beams rigidize the extended panel against folding on the bridged hinge lines.

4. A panel construction according to claim 3 including:
    spring clips secured to said panel sections along said hinge lines which are stressed in said folded configuration of said panel to store elastic strain energy for aiding the strain energy in said sheets to extend said panel to its unfolded configuration.

5. A panel construction according to claim 1 wherein:
    said selected panel section edges are adjacent edges of said panel sections, whereby said beams rigidize said panel sections along said hinge lines.

6. A panel construction according to claim 1 wherein:
    said selected panel section edges are said side and adjacent edges of said panel sections, whereby said beams rigidize said panel sections along all four edges thereof.

7. A panel construction according to claim 6 wherein:
    the sheets secured to the side edges of said panel sections bridge hinge lines of said panel, whereby curling of the latter sheets under the action of said strain energy aids extension of said panel, and the beams formed by the latter sheets when curled to their tubular configuration rigidize said panel against folding on the bridged hinge lines.

8. A panel construction according to claim 7 including:
    spring clips secured to said panel sections along said hinge lines which are stressed in said folded configuration of said panel to store elastic strain energy for aiding the strain energy in said sheets to extend said panel to its unfolded configuration.

9. A panel construction according to claim 8 wherein:
    said panel comprises a solar panel mounting solar cells on the sides of said panel sections adjacent said sheets; and
    said sheets in their flat configuration overlie said cells to provide protective covers for said cells.

10. A panel construction according to claim 1 wherein:
    said panel comprises a solar panel mounting solar cells on the sides of said panel sections adjacent said sheets; and
    said sheets in their flat configuration overlie said cells to provide protective covers for said cells.

11. A deployable panel structure comprising:
    a rectangular folding panel having parallel hinge lines normal to the longitudinal sides of said panel and defining intervening rectangular panel sections having adjacent edges along said hinge lines and side edges along said panel sides, such that said panel is contractable to a folded configuration wherein said panel sections are disposed in confronting face-to-face relation, and said panel is extendable to an unfolded configuration wherein said panel sections are disposed in substantially coplanar relation:
    resiliently flexible sheets secured along one edge to said panel sections along selected edges of said sections;

said sheets being preformed to curl into a tubular configuration and being confined in a flat configuration between said panel sections when said panel occupies its folded configuration, whereby the confined flat sheets store elastic strain energy for curling said sheets to their tubular configuration to provide tubular rigidizing beams along said selected panel section edges when said panel is extended to its unfolded configuration;

a support secured to one end of said panel on a hinge line parallel to said first mentioned hinge lines; and a deployment mechanism on said support including deployment boom means secured to the opposite end of said panel on a hinge line parallel to said first mentioned hinge lines for deploying said panel from its folded configuration against the adjacent side of said support to its deployed configuration in the plane of said boom means.

12. A deployable panel structure according to claim 11 wherein:
said selected panel section edges are said side edges of said panel sections.

13. A deployable panel structure according to claim 11 wherein:
said sheets bridge hinge lines of said panel, whereby curling of said sheets under the action of said strain energy aids extension of said panel, and said beams rigidize the extended panel against folding on the bridged hinge lines.

14. A deployable panel structure according to claim 13 including:
spring clips secured to said panel sections along said hinge lines which are stressed in said folded configuration of said panel to store elastic strain energy for aiding the strain energy in said sheets to extend said panel to its unfolded configuration.

15. A deployable panel structure according to claim 11 wherein:
said selected panel section edges are adjacent edges of said panel sections, whereby said beams rigidize said panel sections along said hinge lines.

16. A deployable panel structure according to claim 11 wherein:
said selected panel section edges are said side and adjacent edges of said panel sections, whereby said beams rigidize said panel sections along all four edges thereof.

17. A deployable panel structure according to claim 16 wherein:
the sheets secured to the side edges of said panel sections bridge hinge lines of said panel, whereby curling of the latter sheets under the action of said strain energy aids extension of said panel, and the beams formed by the latter sheets when curled to their tubular configuration rigidize said panel against folding on the bridged hinge lines.

18. A deployable panel structure according to claim 17 including:
spring clips secured to said panel sections along said hinge lines which are stressed in said folded configuration of said panel to store elastic strain energy for aiding the strain energy in said sheets to extend said panel to its unfolded configuration.

19. A deployable panel structure according to claim 18 wherein:
said panel comprises a solar panel mounting solar cells on the sides of said panel sections adjacent said sheets; and
said sheets in their flat configuration overlie said cells to provide protective covers for said cells.

20. A deployable panel structure according to claim 11 wherein:
said panel comprises a solar panel mounting solar cells on the sides of said panel sections adjacent said sheets; and
said sheets in their flat configuration overlie said cells to provide protective covers for said cells.

* * * * *